United States Patent Office 3,481,970
Patented Dec. 2, 1969

3,481,970
PROCESS FOR PREPARATION OF
β-CHLOROMETHACRYLONITRILE
Russell K. Griffith, Chagrin Falls, and Roman Zorska, Cleveland, Ohio, assignors to The Standard Oil Company, Cleveland, Ohio, a corporation of Ohio
No Drawing. Filed May 8, 1967, Ser. No. 636,633
Int. Cl. C07c 121/02, 131/32
U.S. Cl. 260—465.7                                          5 Claims

ABSTRACT OF THE DISCLOSURE

β-Chloromethacrylonitrile is prepared by treating α,β-dichloroisobutyronitrile with an alkali metal hydroxide or alkoxide in alcohol followed by treatment with chlorine and isolation of the desired product.

---

This invention relates to an improved process for the preparation of β-chloromethacrylonitrile from α,β-dichloroisobutyronitrile.

Although the post-chlorination step of the process of the instant invention has not been disclosed previously, the dehydrochlorination of the α,β-dichloropropionitriles is described in U.S. Patent No. 2,384,106. Although the patent claims only the alkoxy nitriles, the preparation of the α-methyl β-chloroacrylonitrile also is disclosed. The 30.6% yield reported in this patent is not pure β-chloromethacrylonitrile monomer, but is a mixed product boiling within the range of 150–158° C. The patent example, when duplicated in the laboratory, gave a yield of 28.7% of a product mixture boiling between 150–158° C. This product contained only 50% of β-chloromethacrylonitrile so that the yield of the β-chloromethacrylonitrile was only 16%.

Other methods for preparing α-alkyl β-halogenated propionitriles are disclosed in other references. However, none of the prior references disclose the method described in the instant invention. British Patent No. 571,750 discloses pyrolysis at 450–550° C. of dichloroisobutyronitrile which leads to an undisclosed yield of β-chloromethacrylonitrile. The disclosure in British Patent No. 573,563 is essentially the same as that of British Patent No. 571,750. U.S. Patent No. 2,466,641 discloses the vapor-phase chlorination of methacrylonitrile at 500–600° C. This results in a high yield (60%) of chloromethyl acrylonitrile, but less than 8% β-chloromethacrylonitrile. In U.S. Patent No. 2,328,984, α,β-dichloroisobutyronitrile is distilled with quinoline to give 55.4% β-chloromethacrylonitrile and other materials boiling between 120–155° C.

As stated above, β-chloromethacrylonitrile and other products have previously been prepared from α,β-dichloroisobutyronitrile by dehydrochlorination in the presence of alcoholic alkali in rather low yields as described in British Patent No. 573,563 and in U.S. Patent No. 2,384,106. These prior art processes for the preparation of β-chloromethacrylonitrile and other products from α,β-dichloroisobutyronitrile can be expressed as follows:

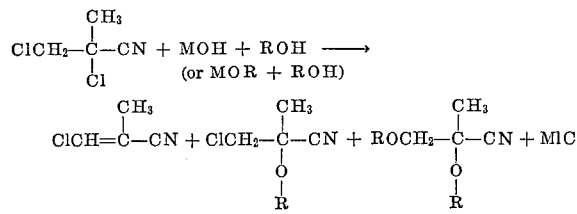

wherein M represents an alkali metal such as sodium or potassium and R represents a lower alkyl group such as methyl or ethyl.

The improved process of the present invention involves carrying out the process expressed above plus the further steps of chlorinating the product mixture followed by isolation of the desired product, β-chloromethacrylonitrile. The mechanism or mechanisms involved in the novel step of applicants' process is not understood. In any event, the applicants' improved process is unlike any prior art process in that it includes a halogenation step before recovery of the desired β-chloromethacrylonitrile, and it produces unexpectedly higher yields of the desired product than are produced by the prior art dehydrochlorination processes.

We have discovered that by halogenating the product mixture obtained by reaction of a nitrile having the structure

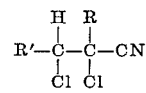

wherein R is a lower alkyl group such as methyl or ethyl and R′ is hydrogen or a lower alkyl group with an alkali metal hydroxide or alkali metal alkoxide in a lower alkyl alcohol that yields of desired β-chloromethacrylonitrile are significantly increased over those obtained without the halogenation step. The product obtained by our process is essentially pure monomer consisting of a mixture of the cis and trans-isomers. In our process an alkali metal hydroxide or alcoholate, preferably an alkali metal alcoholate such as sodium or potassium alcoholate, is reacted with an α-alkyl, α,β-dihalopropionitrile. In each case the halogen may be chlorine, which is most available and thus preferred, or bromine or both chlorine and bromine may be represented. The alcoholates either as such or preferably as a mixture of the alcohol and the alkali metal hydrate with the alcohol in excess, may comprise various lower alcohols such as methanol, ethanol, propanol, isopropanol, n-butanol and the like. Preferred are ethanol and the propanols and most preferred is ethanol.

In carrying out the preferred process of this invention, α,β-dichloropropionitrile is placed in a container cooled to wet-ice temperature and an equal molar quantity of an alcoholic solution of an alkali metal hydroxide is added gradually. Following the exohtermic reaction which takes place, the contents of the container are filtered to remove the alkali metal halide formed in the reaction. The filtrate may be washed with water and distilled. The distillate is a mixture of at least four main components as determined by gas chromatography. The distillate or filtrate, if the distillation is not carried out, from above is treated with gaseous chlorine at about 25° C. or below and another exothermic reaction occurs. Distillation of the chlorinated mixture proceeds smoothly giving essentially pure monomer. More details of the process of this invention are given in the following examples which will further illustrate our invention.

EXAMPLE I

One part by weight of α,β-dichloroisobutyronitrile was charged into an ice-cooled reactor. 0.407 part of potassium hydroxide dissolved in 2.47 parts of ethyl alcohol were added slowly to the stirred α,β-dichloroisobutyronitrile. The addition of the alcoholic potassium hydroxide required 45 minutes. The reaction mixture was stirred for an additional 30 minutes and was then carefully neutralized with concentrated hydrochloric acid. Gaseous chlorine was then bubbled through the cooled reaction mixture causing an exothermic reaction. After the exotherm subsided, the reactor contents were washed twice with distilled water and then were distilled at reduced pressure yielding 33.5% (0.247 part) of the theoretical amount of pure β-chloromethacrylonitrile.

EXAMPLE II (A) A solution of 100 parts of 1,2-dichloroisobutyronitrile and 236 parts of ethyl alcohol were charged into an ice-bath cooled reactor. The stirred solution was reacted with 80 parts of a 50% aqueous sodium hydroxide solution added dropwise over a 30-minute period. The reaction mixture was then stirred at room temperature for an additional hour, after which the ethyl alcohol was removed by distillation at reduced pressure. The reaction vessel was again placed in an ice-bath and the contents treated with gaseous chlorine for a 20-minute period (at which time no additional chlorine absorption occurred). Distillation to dryness under reduced pressure (5–15 mm. Hg.) yielded 94.5 parts of a colorless liquid containing 45% of the two isomers of β-chloromethacrylonitrile, corresponding to 41.9% of the theoretical yield (42.5 parts).

(B) Procedure A of this example was repeated except that the chlorination step was not included. In this instance 110.2 parts of a yellow liquid containing 29.0% of the two β-chloromethacrylonitrile isomers were obtained. The yield of desired product corresponded to 30.4% of the theoretical value (31.9 parts).

EXAMPLE III 100 parts of 1,2-dichloroisobutyronitrile were treated with an equimolar amount of 2.60 N sodium ethoxide in ethyl alcohol. The alkoxide was added dropwise to the rapidly stirred, ice-bath cooled dichloroisobutyronitrile under a nitrogen atmosphere over a period of one hour. Upon completion of the sodium ethoxide addition, the ice-bath was removed and the reaction mixture was stirred at room temperature for 15 minutes. The ethanol was then removed by distillation at reduced pressure (200 mm. Hg.). Gaseous chlorine was then bubbled through the cooled reaction mixture causing an exothermic reaction. The reaction mixture was then distilled to dryness at 0.5 mm. Hg yielding 96 parts of a colorless liquid containing 37% of the β-chloromethacrylonitrile isomer corresponding to a yield of 48.3% (49.0 parts) of the theoretical value.

EXAMPLE IV

The procedure of Example III was repeated except that the chlorination step was not included. In this instance 56.8 parts of distillate containing 34% of the isomers of β-chloromethacrylonitrile were obtained. The yield of desired product was 26.7 parts corresponding to 26.3% of the theoretical value.

We claim:
1. The process for preparing an olefinic nitrile having the formula

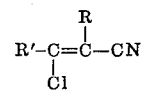

wherein R is methyl or ethyl and R' is hydrogen or a lower alkyl group comprising treating a nitrile compound having the formula

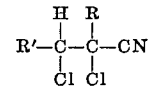

wherein R and R' have the foregoing designations with
(1) essentially equimolar quantities of an alkali metal hydroxide or an alkali metal alkoxide in a lower alkyl alcohol at a temperature of about 0° C,
(2) treating the reaction mixture resulting from step (1) with gaseous chlorine at a temperautre below about 25° C.

and recovering the β-chloro olefinic nitrile product therefrom.

2. The process of claim 1 wherein R is methyl and R' is hydrogen.

3. The process of claim 2 wherein the alkali metal hydroxide is sodium hydroxide.

4. The process of claim 2 wherein the alkali metal hydroxide is potassium hydroxide.

5. The process of claim 2 wherein the lower alkyl alcohol is ethyl alcohol.

References Cited
UNITED STATES PATENTS

| | | | |
|---|---|---|---|
| 2,231,838 | 2/1941 | Lichty | 260—465.7 |
| 2,328,984 | 9/1943 | Lichty | 260—465.7 |
| 2,384,106 | 9/1945 | Lichty | 260—465.6 |
| 2,428,907 | 10/1947 | Clifford et al. | 260—465.7 XR |

JOSEPH P. BRUST, Primary Examiner

U.S. Cl. X.R.

260—465.6